United States Patent [19]

Simmons et al.

[11] 4,102,653

[45] Jul. 25, 1978

[54] AROMATIC WOOD FUEL BRIQUETTE AND METHOD OF MAKING AND USING THE SAME

[75] Inventors: Charles T. Simmons, 2452 Dorchester, Troy, Mich. 48084; William B. Lampert, III, Ypsilanti, Mich.

[73] Assignee: Charles T. Simmons, Troy, Mich.

[21] Appl. No.: 793,189

[22] Filed: May 2, 1977

Related U.S. Application Data

[63] Continuation-in-part of Ser. No. 649,142, Jan. 14, 1976, abandoned.

[51] Int. Cl.$^2$ .......................... C10L 5/12; C10L 5/40; C10L 5/00
[52] U.S. Cl. ..................................... 44/16 R; 44/10 B
[58] Field of Search ................... 44/10 B, 6, 15 C, 41, 44/1 E, 15 B, 16 R

[56] References Cited

U.S. PATENT DOCUMENTS

| | | | |
|---|---|---|---|
| 1,860,743 | 5/1932 | Komarek | 44/16 R |
| 2,247,026 | 6/1941 | Johnson | 44/16 R |
| 2,341,377 | 2/1944 | Hinderer | 44/15 |
| 2,916,365 | 12/1959 | Smith | 44/41 |
| 3,492,134 | 1/1970 | Brummendorf | 44/14 |
| 3,651,596 | 3/1972 | Orsing | 44/40 |
| 3,709,700 | 1/1973 | Ross | 44/6 |

*Primary Examiner*—Carl F. Dees
*Attorney, Agent, or Firm*—Krass & Young

[57] ABSTRACT

To smoke meats while they are being cooked with the heat generated from charcoal briquettes or other fuels, briquettes or sections of aromatic woods are treated to substantially eliminate flaming and control the rate of aromatic smoke and vapor emission during combustion as the briquettes are burned with the fuel. This treatment produces a continuous and relatively uniform non-flaming emission of aromatic smoke and vapors for a period of time more closely matched to that of the cooking process.

6 Claims, No Drawings

AROMATIC WOOD FUEL BRIQUETTE AND METHOD OF MAKING AND USING THE SAME

CROSS REFERENCE TO RELATED APPLICATIONS

This application is a Continuation-in-Part of U.S. Ser. No. 649,142 filed Jan. 14, 1976 and now abandoned.

BACKGROUND OF THE INVENTION

1. Field of the Invention

This invention relates to aromatic woods treated to inhibit the process of their natural combustion so as to be adapted to be used along with fuels for smoking meats and the like, and to methods of forming such articles.

2. Prior Art

For centuries meats, fish and like foods have been cooked by burning hickory and other aromatic woods such as maple, birch, ash, oak, apple wood, willow, sassafras, and certain pines. During their combustion, which generates heat to cook the foods, these woods also generate aromatic smoke and vapors which impart flavor to the foods, color them, and act to preserve them.

A problem associated with the use of wood and particularly aromatic woods, as cooking fuels is that their combustion rates are generally very high and they initially produce relatively large quantities of smoke and vapor and subsequently a great deal of flame as they combust. Accordingly, if meat or the like is barbecued in a closed system using this aromatic wood as a fuel, the excessive smoke and vapor overcures the meat long before it is cooked. If an open fire is used most of the smoke is lost and flaming predominates. If aromatic woods are used along with other slower burning non-flaming fuels such as charcoal, the rapid combustion of the aromatic woods causes initially excessive rates of smoke and vapor production followed by flaming of the wood and then the rate sharply decreases as the aromatic woods burn out, usually long before the food is cooked.

For these reasons and the relatively high cost of the aromatic woods, cooking and smoking processes have often employed relatively small quantities of aromatic woods in association with other fuels more suited to cooking such as charcoal briquettes or in similar association with wood embers. The major portion of the cooking heat may thus be derived from these other fuel substances while the aromatic woods produce relatively smaller quantities of heat and hopefully sufficient smoke and vapor to impart the desired treatment to the food. However, this approach does not entirely solve the problem, since the aromatic woods, while first emitting relatively large quantities of aromatic smoke and vapors, will subsequently flame up, and then rapidly burn out, long before the cooking has been completed. This is a considerably different situation from the ideal, in which a controlled and uniform production of a relatively small quantity of aromatic vapors and smoke over substantially the entire cooking interval is produced by the combustion of the aromatic wood. Prior art attempts to solve this problem have included the approach described in U.S. Pat. No. 2,341,377, in which a form of briquette consisting of comminuted charcoal and aromatic woods along with binding agents chosen to avoid excessive impeding of the combustion of the briquettes. The aromatic wood contents of these briquettes are chosen to produce the desired smoke and vapor during their combustion and, in theory, to match the combustion of the aromatic wood to that of the charcoal. However, the intimate admixture of charcoal and aromatic wood particles creates certain difficulties and, in any event, will not produce the ideal situation described above. That is, the relatively high temperatures to which the wood particles are subjected will produce flaming of the aromatic smoke and vapors, reducing the quantity available for flavoring the food. In addition, the proportion of aromatic wood and charcoal is fixed, which precludes any variation in the relative amount of smoking produced, which is a considerable disadvantage, since tastes vary widely among individuals as to the extent of "smokey" taste desirable. Finally, the use of binders having flame retardant characteristics must be used very sparingly, since the ignitability and combustibility will be adversely affected, creating a fuel that is difficult to light and to keep lit.

Another approach, described in U.S. Pat. No. 2,916,365, involves the coating of blocks of aromatic woods to inhibit the initial burning of the wood, but this process also produces flaming and burning of the aromatic vapors and smoke, which flaming is highly undesirable, since the cooking fire is excessively hot until such flame cessates. Also, the aromatic wood is relied on to produce the cooking heat which is uneconomic in the use of the aromatic woods, and in addition, notwithstanding the treatment thereof, the flaming resulting renders the wood undesirable as a cooking fuel.

Another aromatic wood product designed to meet the needs of the home barbecuing market consists of packaged sections of aromatic wood. The instructions accompanying these packages advise the users to soak the wood in water before use and then to use the wood along with charcoal briquettes or other fuels. The soaking is intended to decrease the natural combustion rate of the aromatic wood to prolong its smoke production to match the cooking time of the meat. Of course, in practice, soaking the wood results in a highly non-uniform smoke production rate: first, the excess moisture is steamed off with little production of natural aromatic wood smoke or vapor, then the smoke or vapor is produced at a very high rate as the aromatic burns at its natural high rate and flaming often occurs. Moreover, the soaking is an annoying and time consuming step. Wet wood is only added after the fuel source is lit.

SUMMARY OF THE INVENTION

This invention is directed to an aromatic wood product for use in barbecuing foods which overcomes the disadvantages of the previous product. Broadly, the present invention is directed toward aromatic wood products treated to inhibit combustion thereof, preventing flaming and controlling the emission rate of the aromatic smoke and vapors at temperatures sufficient to produce cooking heat. These articles are adapted for use in association with conventional fuels such as nonaromatic woods, charcoal, or gas. The resulting combustion process is such as to generate relatively uniform amounts of non-flaming smoke and vapor during the entire cooking process and their lives match or exceed the life of the fuel for the total cooking time of the food.

Used in appropriate ratios with conventional fuels, these products will then produce aromatic smoke and vapor at a generally uniform rate over the life of the other fuels. Their time elapsed during combustion will be increased to the point where they will not contribute in a large degree to the heat which cooks the meat; that is, if these products were used alone, without other heat producing fuels, it would be difficult to maintain them in a combusting state and the heat produced would not be sufficient for most cooking purposes. This factor distinguishes the present product from all previous aromatic wood products of this type. Even aromatic wood chunks soaked in water only exhibit inhibited combustion for a short period of time during their life. The treatment of the present products are such that combustion of the emitted aromatic smoke and vapors are inhibited until they are totally consumed.

The process of the present invention may be applied to either naturally occuring sections of aromatic wood, i.e., chunks, blocks, small logs and the like, or to comminuted aromatic woods molded into briquettes. The treatment of the naturally occurring sections involves their impregnation with a class of combustion retarding chemicals which are not quickly dissipated by the combustion process. The combustion retarding additives may act either physically or chemically upon the combustion process. They may cause changes in porosity, thereby changing the available surface area for combustion activity. Some may melt or fuse at combustion temperatures coating the combustion surfaces of the wood and decreasing combustion by reducing the rate of oxygen transport to the surface. Other additives undergo a series of changes in physical state at combustion temperatures, to store the heat energy supplied by the fuel components, and hold the wood temperature below that required for flaming or rapid combustion. Some chemical additives undergo chemical reactions while the wood or volatile wood products produced under heat to reduce the rate of flammable vapor generation. Finally, some chemical additives decompose or react with the wood or volatile wood products at combustion temperatures to produce non-flammable gases which are incapable of supporting a flame or retard the rate of oxygen transport to the surface.

The additives which have been found most effective in limiting flammability and controlling smoke evolution rate by inhibiting combustion, include alkali metal salts, ammonium salts, boric acid, phosphoric acid, and combinations of these. The alkali metal salts specifically include alkali metal acetates, borates, carbonates, bicarbonates, halides, hydroxides, nitrates, oxides, mono- and dihydrogen phosphates, silicates, and sulfates and bisulfates and the ammonium sales specifically include borates, carbonate and bicarbonate, halides, nitrate, and mono- and dihydrogen phosphates, sulfamate, sulfate, and hydrogen sulfate. Certain combinations of the above have been found as effective or more effective than the individual components. Examples include borax and boric acid, borax and ammonium dihydrogen phosphate, and ammonium chloride and ammonium dihydrogen phosphate.

The degree of impregnation of the wood with these chemicals will depend upon the natural characteristics of the wood and the ultimate combustion rate desired, but typically the flame retardant chemicals may vary between 40% by weight of the final product and 1% by weight. The percentage will be chosen to produce the desired combustion inhibiting effect described in the particular wood type utilized.

The preferable process for impregnating the natural wood products with the flame retardant chemicals, which will be subsequently disclosed in detail, involves first heating the wood to increa e its porosity. This heating may be performed by steaming the wood at elevated temperature and pressure. Afterward, the wood is dried, preferably by a vacuum process, then it is impregnated by immersing it in an aqueous solution of the flame retardant chemical, under conditions of elevated temperature and pressure. After the product dries, it is ready for use.

The products of the present invention additionally may take the form of molded briquettes formed of, or including, comminuted particles of aromatic wood. The briquettes may achieve their reduced combustion rates by the presence of the aforementioned flame retarding chemicals, or by an increase in density resulting from the pressure molding process, or a combination of the two. The briquettes will require a binding agent as an aid in retaining the cohesion of the particles in a mass if a flame retarding agent which can also act as a binding agent is not employed.

The alkali metal salts listed above as combustion control agents act as suitable binding agents. Gums, such as tragacanth and gum arabic, starches, sugars, and other carbohydrate substances are among desirable binders. They may influence combustion rates to a certain degree.

The process of molding briquettes employing comminuted aromatic wood particles may be performed either under pressure or simply by casting slurries comprised of the wood particles in an aqueous solution of the flame retarding agents and/or binding agents in a mold, and heating the mold.

The invention will be exemplified by the following compositions:

EXAMPLE I

For 100 pounds of product 95 pounds of comminuted hickory, approximately 20 to 100 mesh, are mixed in a rotating drum mixer with 5 pounds of pregelantinized corn starch as a binding agent. When the mixture is uniform approximately 25 pounds of water are sprayed onto the mixture in a mist and mixing is continued until the mixture is uniformly moist. The mixture is then formed into molded discs approximately one to two inches in height and diameter. These discs are then allowed to dry in the mold by subjecting them to temperatures of 200° to 250° F. Once dried to a stable atmospheric moisture content, the discs are ready for use.

In variations of this formula differing ratios of hickory to corn starch could be employed up to approximately 55% by weight of the corn starch to 45% by weight of the hickory. This formulation produces the desired inhibiting effect on the flame up through the combustion cycle.

This particular formulation produces a product having a combustion rate of approximately 12 weight percent per minute when using wood having a "combustion rate" of approximately 20 weight percent per minute. The combustion rate referred to is as measured by the American Society for Testing and Materials test E-69-50. The decreased combustion rate may be considered a composite combustion rate for the corn starch binder and the comminuted wood.

EXAMPLE II

For 100 pounds of aromatic hickory product 85 pounds of comminuted hickory, approximately 20 to 100 mesh, are mixed in a rotating drum mixer with 15 pounds of sodium bicarbonate as a chemical additive. The processing proceeds as in Example I.

The described decrease in flaming results from the continued combustion retarding action of the sodium bicarbonate through the combustion process. The other combustion retarding agents, previously listed, may be substituted for the sodium bicarbonate. Quantities may range from 1% to 50% by weight of the chemical additives to the total weight, depending upon the combustion rate of the wood used, the particle size of the wood and the particular combustion retardant wood.

EXAMPLE III

For 100 pounds of aromatic hickory product, 80 pounds of comminuted hickory of approximately 20 to 100 mesh, are treated with 5 pounds of pregelantinized corn starch, and 15 pounds of sodium bicarbonate. The processing proceeds as in Example I.

The previously listed binding agents may be substituted for the corn starch and the previously listed combustion retarding agents for the sodium bicarbonate. The binding agent will be present in from 1% to 55% by weight and the combustion retarding agent from 1% to 30% by weight in the final composition in order to achieve a product with a combustion rate of between 10.0 and 0.05 weight percent per minute.

EXAMPLE IV

One hundred pounds of hickory wood, having a combustion rate of approximately 18 weight percent per minute is placed in a steam chamber for two hours at 40 p.s.i.g. The wood is then dried by subjecting it to a full vacuum for 1½ hours. The wood is then immersed in a 15% by weight aqueous solution of sodium bicarbonate at 170° F and 150 p.s.i.g. for about three hours. The wood is then removed and dried and results in a product having a chemical content of about 12% by weight. The product has a combustion rate of approximately 1.0 weight percent per minute.

EXAMPLE V

Eighty pounds of comminuted hickory approximately 20 to 100 mesh are mixed in a rotating drum mixer with five pounds of pregelantinized corn starch as a binding agent. When the mixture is uniform, 25 pounds of water are sprayed into the mixture is a mist and mixing is continued until the mixture is uniformly moist. The slurry is then poured into the mold cups of a briquetting press and pressed at 1200 pounds per square inch. The resulting briquettes, after drying at 250° F, exhibit a high degree of cohesion and a combustion rate of approximately 2.0 weight percent per minute when wood having a combustion rate of about 20 weight percent per minute is employed. These briquettes may be used with conventional charcoal briquettes in the ratio of about five parts fuel briquettes to one part aromatic wood briquettes and will produce smoke and vapor, at sufficient rates for proper curing of most meats, steadily during the life of the charcoal briquettes.

The molding pressure used may be varied, depending upon the specific characteristics of the wood and the chemical composition used, to obtain briquettes having densities varying from about 20 to about 80 pounds per cubic foot. These briquettes will have combustion rates inversely proportional to their densities and ranging from about 0.05 to 12.0 weight percent per minute, depending upon both the density and the briquette composition.

It has been found that the resulting wood products exhibit substantially different characteristics when tested under the American Society for Testing and Materials' standard method of testing for "Combustible Properties of Treated Wood by the Fire-Tube Apparatus". Firstly, much lower initial temperatures are produced in the treated wood, since flaming produced by flaming of the emitted smoke and vapor is minimized. Secondly, the tested product appears to exhibit self-extinguishing characteristics, in that combustion will cease upon removal of external heat source with a relatively large unburned mass remaining, i.e., 76% burned, versus typical ash residues of 4% or less for similar untreated wood products.

While such characteristics would be undesirable in wood products used as the primary cooking fuel, the present invention contemplates the use of the described wood products in conjunction with an external heat source such as burning charcoal, which would prevent such self-extinguishing to occur. Thus, the amount of smoke and vapors produced can be controlled by simply adding greater or lesser quantity of the treated wood products.

Several important secondary advantages also have been found to accrue from the above formulation: The residue of the briquettes has a high degree of structural integrity such that they may be readily removed which is a highly important feature in connection with gas fired grills, since ash powder residue is difficult to remove.

Hygroscopic binders such as corn starch and combustion retardants such as sodium bicarbonate make the drying process incidental to manufacture much easier, since the initial moisture content is easier to control. Also, in use, the occasional flame-ups which occur are more easily controlled by the ready absorption created by the hygroscopic action of water applied to douse the flame-ups.

The embodiments of the invention in which an exclusive property or privilege is claimed are defined as follows:

1. Smoke generating briquettes adapted to be used with a cooking heat source for generating aromatic smoke and vapors for smoking food during cooking with said heat source, said briquettes comprising: aromatic wood particles compressed with a combustion retardant binder into briquettes, said proportion of said combustion retardant binder being sufficient to produce self extinguishment of said briquettes in the absence of an external heat source to thereby prevent flaming by inhibiting combustion of emitted aromatic smoke and vapors, during substantially the entire combustion cycle of the briquettes, whereby, when subjected to the heat generated by said heat source, said briquettes will combust so as to generate said aromatic smoke and vapors over an extended time period and will not appreciably augment the heat generated by said heat source.

2. The articles of claim 1 in which the combustion retardant binder is chosen from the group consisting of alkali metal salts, ammonium salts, boric acid and phosphoric acids.

3. The briquettes of claim 1 wherein the molding is performed in a press and the pressure exerted is such that the density of the molded briquettes is between 20 and 80 pounds per cubic foot.

4. The briquettes of claim 1 wherein the comminuted aromatic wood is mixed with an aqueous solution of said binder before molding.

5. The briquettes of claim 4 wherein the binder is chosen from a group consisting of carbohydrates and alkali metal salts.

6. The briquettes of claim 1 in which the briquettes are molded by mixing them with an aqueous solution of a combustion retarding binder chosen from the group consisting of alkaline metal salts, ammonium salts, boric acid and phosphoric acid.

* * * * *